Figure 1:
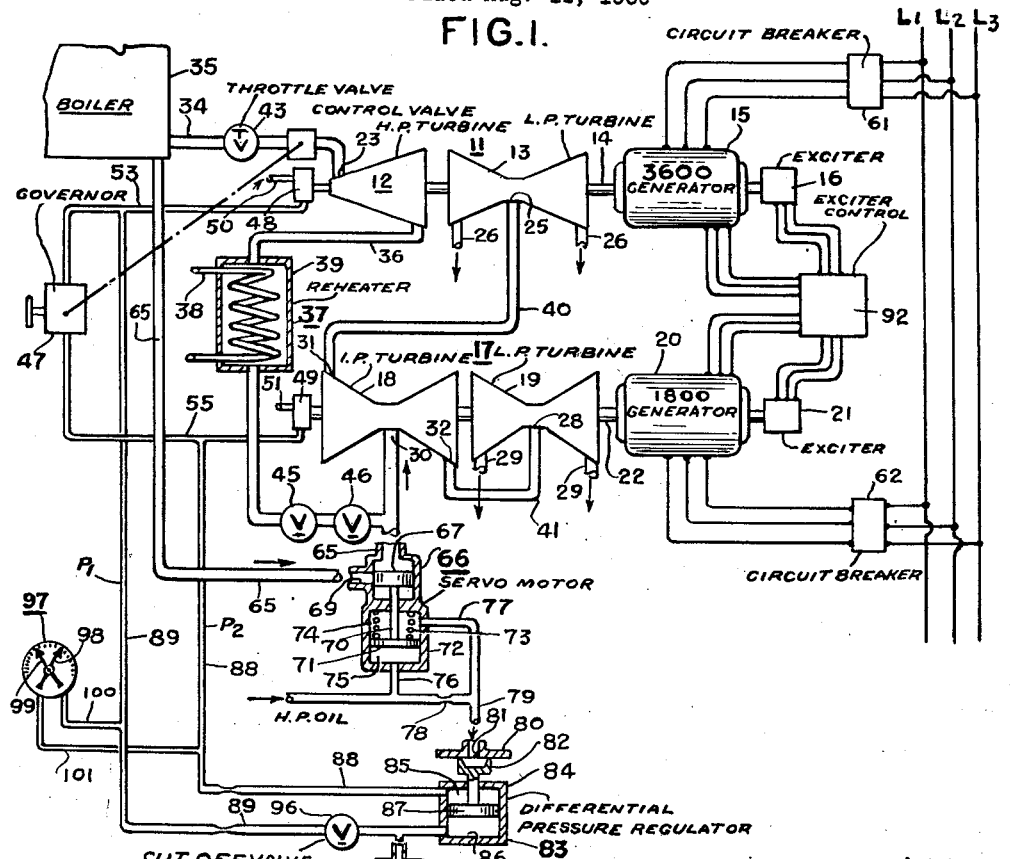

Jan. 15, 1963  M. CSANADY, JR  3,073,964

TURBINE APPARATUS

Filed Aug. 11, 1960

INVENTOR
MICHAEL CSANADY JR
BY Frank Citain Jr.

United States Patent Office 3,073,964
Patented Jan. 15, 1963

3,073,964
TURBINE APPARATUS
Michael Csanady, Jr., Ridley Park, Pa., assignor to Westinghouse Electric Corporation, East Pittsburgh, Pa., a corporation of Pennsylvania
Filed Aug. 11, 1960, Ser. No. 48,928
7 Claims. (Cl. 290—4)

This invention relates to a system for controlling the acceleration of an elastic motive fluid turbine power plant having a plurality of turbine units driving separate power output shafts, and is more specifically concerned with a power plant of the above type wherein one of the turbine units is driven by high pressure motive fluid and the other turbine unit is driven by motive fluid at a lower pressure.

One of the main objects of the invention is to provide, in a power plant of the above type, a system for controlling the joint acceleration of the turbine units during starting, so that the turbine units may be jointly accelerated at the same rate, until a predetermined percentage of their rated speeds is attained, in order that each of the turbine units may subsequently carry its load properly.

Another important object is to provide, in a power plant of the above type wherein each of the turbine units drives an electrical generator and an exciter for the generator, a system for controlling the joint acceleration of the turbine units during starting, until a preselected percentage of their rated speeds is obtained, so that the generators may be electrically energized at the preselected speeds by connecting the electrical output of the turbine driven exciters to the generator field windings.

Steam turbine power plants of the above type, for example, cross-compound power plants, comprise a first group of steam turbine units connected in tandem and a second group of steam turbine units connected in tandem. Each group is drivingly connected to an electric generator and an exciter for energizing the field windings of its associated generator, and the generators are connected in parallel with each other across a power transmission line.

Cross-compound power plants are susceptible of many arrangements of their turbine units, one representative arrangement being a high pressure (H.P.) turbine unit and a low pressure (L.P.) turbine unit in the first group and an intermediate pressure (I.P.) turbine unit and a low pressure (L.P.) turbine unit in the second group. The two groups are preferably motivated by steam from a common boiler or steam generating source, but are not connected to each other mechanically. Hence, during starting, unless the two generators are provided with field excitation, the first group (H.P. and L.P. units) has a tendency to accelerate to its rated speed before the second group (I.P. and L.P. units) starts to accelerate.

However, at the slow speed attained during starting by auxiliary "turning gear" devices, the shaft driven exciters do not provide sufficient electrical power to energize the generator field windings. Accordingly, in at least one present cross-compound power plant system, a separately driven electrical exciter, for example, a motor generator set, is employed to jointly energize the field windings of the two generators while the two turbine groups are slowly turned by turning gear at a speed of from 3 to 30 r.p.m. With the two generators thus electrically excited and interconnected, the generator driven by the H.P., L.P. turbine group will generate sufficient electrical power to electrically drive the generator driven by the I.P., L.P. turbine group as a motor, until the two generators are rotating at their rated or synchronous speeds. Thus both generators are initially electrically interlocked at low turning gear speeds, and are subsequently jointly accelerated to their synchronous speeds.

When the generators attain synchronous speed, the motor generator set is disconnected and shut down and the turbine driven exciters are employed to continue excitation of their associated generators.

Although the above system has been found to be highly reliable and satisfactory, it does require a separately driven exciter for use during the starting period of the power plant.

In view of the above, it is a further object of the invention to provide a system for controlling the acceleration of the two turbine groups in a cross-compound power plant by augmenting the motive steam supply to the second or lower pressure turbine group in response to a signal indicative of the difference in percentage of rotational speed of the two groups, in order that the generators may be electrically synchronized with each other after the speed of the two groups has attained a predetermined value sufficient to enable the shaft driven exciters to adequately energize the generator field windings. One of the main advantages resides in obviating the separately driven exciter, with its additional cost of procurement and maintenance.

Briefly, the acceleration of the first and second turbine groups is controlled by providing an additional steam supply conduit for delivering H.P. steam to the I.P. turbine unit in the second group and controlling admission of the steam thereto by a regulated valve mechanism. During operation, the valve mechanism is biased toward the flow blocking position and is urged in unblocking direction in response to a signal which is proportional to the difference in the percentage of rated speeds of the two turbine groups. This signal may be obtained preferably by hydraulic control apparatus including a first hydraulic fluid pressurizing impeller driven by the first turbine group and providing a first pressure proportional to speed of the latter, a second hydraulic fluid pressurizing impeller driven by the second turbine group, and providing a second pressure proportional to speed of the latter, a differential pressure regulator actuated in response to the difference in the two hydraulic fluid pressures, and means responsive to the differential pressure signal for regulating the valve mechanism.

Figure 2:
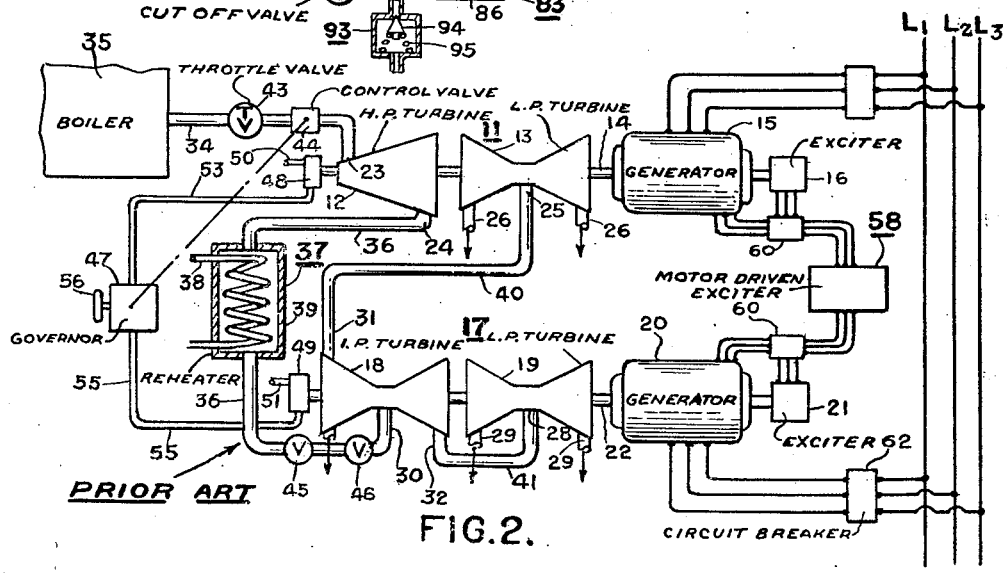

The above and other objects are effected by the invention as will be apparent from the following description and claims taken in connection with the accompanying drawing, forming a part of this application, in which:

FIG. 1 is a diagrammatic view illustrating a cross-compound steam turbine power plant having a control system incorporating the present invention; and FIG. 2 is a diagrammatic view illustrating a prior cross-compound steam turbine power plant arrangement.

Referring to the drawing in detail, in order that the invention may be more fully evaluated in its proper perspective, the power plant arrangement shown in FIG. 2 will first be described. FIG. 2 shows a known cross-compound steam turbine power plant arrangement utilized to provide electrical power in large quantities for public consumption. This power plant includes a first turbine group 11 having an H.P. turbine 12 and an L.P. turbine 13 connected to each other in tandem and having an output shaft 14 to which is connected an electrical generator 15. An electrical exciter 16 is also connected to the output shaft 14 so that it is rotated jointly with the generator 15.

A second turbine group 17, including an I.P. turbine unit 18 and an L.P. turbine unit 19 connected in tandem with each other, is employed to drive a second generator 20 and a second exciter 21 by means of a common output shaft 22.

Although the turbine units may be of any suitable type, the H.P. turbine unit has been illustrated as of the single flow type wherein the steam is admitted thereto through an inlet 23 disposed at one end and exhausted therefrom through an outlet 24 at its other end, while the two L.P. turbine units 13 and 19 and the I.P. turbine unit 18 are of the central admission double flow type. Accordingly, the L.P. turbine unit 13 is provided with a central admission inlet 25 and a pair of divided outlets 26 disposed at opposite ends thereof. In a similar manner, the L.P. turbine unit 19 is provided with a central inlet 28 and a pair of divided outlets 29, and the I.P. turbine unit 18 is provided with a central inlet 30 and a pair of divided outlets 31 and 32.

Elastic motive fluid, for example, steam at a high pressure and temperature, is admitted to the H.P. turbine unit 12 by a conduit 34 connected to a generating source of such high pressure fluid, such as the steam boiler 35, and the exhaust outlet 24 of the H.P. turbine unit is connected to the inlet 30 of the I.P. unit 18 by a conduit 36. Although not essential, a suitable reheater 37 is interposed in the conduit 36 to reheat the steam flowing therethrough to a suitable value for use in the I.P. unit. As well known in the art, the reheater 37 includes a heater coil 38 disposed within a shell 39 through which the steam to be reheated flows. The I.P. exhaust outlet 31 is connected to the L.P. unit 13 by a conduit 40, while the other I.P. exhaust outlet 32 is connected to the inlet 28 of the L.P. unit 19 by another conduit 41.

Steam flow from the boiler 35 to the H.P. unit 12 is regulated by a throttle valve 43 and a suitable control valve 44, while steam flow through conduit 36 to the I.P. unit 18 is controlled by a suitable "reheat" valve 45 and an "interceptor" valve 46.

The control valve 44 is regulated by a speed governor 47 which, in the example shown, is of the hydraulically actuated type and is controlled by hydraulic fluid delivered thereto by a first fluid impeller mechanism 48 driven by the first turbine group 11 and a second fluid impeller mechanism 49 driven by the second turbine group 17. Hydraulic fluid is admitted to the impeller mechanisms 48 and 49 by conduits 50 and 51, respectively, connected to a suitable source of such fluid and, after increase in pressure value by the impeller mechanisms 48 and 49, is delivered to the governor 47 by conduits 53 and 55, respectively. As well known in the art, the pressure value of the fluid delivered to the governor mechanism 47 is variable as a function of the square of the speed of rotation of the impeller mechanisms, so that the speed of the two turbine groups 11 and 17 may be controlled by adjustment of the governor mechanism 47, for example, by rotation of a suitable hand wheel 56.

The above power plant arrangement operates in the following manner: steam from the boiler 35 is supplied to the H.P. turbine unit 12 by conduit 34 and is partially expanded during flow therethrough to energize the H.P. unit, and is thence directed through conduit 36 to the I.P. turbine inlet 30 after being reheated in the reheater 37 to augment the energy of the steam. The steam is divided during flow through the I.P. unit 18 and fifty percent of this flow is expanded in the left-hand portion of the unit while the remaining fifty percent is expanded in the right-hand portion. After expansion in the I.P. unit 18, the steam flowing through the exhaust outlet 31 is admitted to the L.P. unit 13 by the inlet 25 wherein it also divides during flow therethrough and is exhausted through the outlets 26 after final expansion. The remaining fifty percent is directed through the exhaust outlet 32 of the I.P. unit 18 and is admitted to the L.P. unit 19 through the inlet 28 by conduit 41, wherein it also divides and is further expanded before exhausting through the exhaust outlets 29. Although not shown, the exhaust outlets 26 and 29 of the L.P. units 13 and 19 are directed to one or more suitable steam condensers, in a manner well known in the art.

Power plants of this type are conventionally rotated at slow speed, within a range of 3 to 30 r.p.m. for a considerable length of time before starting, for reasons well known in the art. This slow speed rotation is attained by utilizing turning gear motors (not shown). Since the speed of the turning gear motors may be closely controlled, the generators 15 and 20 are electrically interlocked and synchronized with each other during such turning gear rotation. However, since at such slow speeds the electrical power generated by the shaft driven exciters 16 and 21 is insufficient to energize the field windings of their associated generators, a separately driven electrical exciter 58 is employed to excite the generators 15 and 20 during such slow speed mechanical rotation of the two turbine groups 11 and 17.

Since the two generators 15 and 20 are electrically connected to each other while under the joint electrical excitation from the separate exciter 58, when motive steam is subsequently applied to the power plant, any tendency for the first group 11 to accelerate at a more rapid rate than the second group 17 is counteracted by the electrical characteristics of the two generators. That is, if the output shaft 14 should rotate at a higher speed than the output shaft 22, the electrical generator 15 will furnish sufficient excess power to drive the generator 20 as an electric motor, thereby maintaining the speed of the two shafts at the same value.

After the steam is applied to the power plant and the two groups are accelerated to their rated speeds, the separate exciter 58 is disconnected from the two generators and normal continuous excitation may be applied to the generators by their associated exciters 16 and 21 by suitable control mechanisms 60. Accordingly, the two generators are electrically synchronized with each other and may be connected to a power transmission line such as the three phase line L1, L2 and L3 by suitable circuit breakers 61 and 62.

Referring now to FIG. 1, there is illustrated a cross-compound steam turbine power plant which is similar to the power plant of the prior art described above, but having a control system incorporating the invention. Since many of the components may be the same as those already described in connection with the prior art, these components will be identified by the same reference numerals while other components will be further identified to more clearly point out the invention.

The power plant shown in FIG. 1 includes a bypass conduit 65 for supplying H.P. steam directly from the boiler 35 to the admission inlet 30 of the I.P. turbine unit 18 in the second turbine group 17. This conduit 65 is disposed in parallel flow relation with the conduit 36 extending from the H.P. turbine exhaust outlet 24 to the I.P. turbine inlet 30 and flow of H.P. motive steam therethrough is controlled by a valve mechanism 66, which in the example shown is a hydraulically actuated servomotor valve.

The servomotor valve 66 includes a movable piston valve member 67 disposed within a housing 68 and arranged to block and unblock an inlet port 69. The movable valve member 67 is provided with a central shaft 70 connected to a piston portion 71 disposed within a suitable cylindrical chamber 72 disposed within the housing 68 and the movable valve member 67 is biased to the port unblocking position by a suitable spring 73. The piston member 71 divides the chamber 72 into an upper portion 74 and a lower portion 75. High pressure oil from a suitable source (not shown) is admitted to the lower chamber by a branch conduit 76, while oil at a regulated pressure value is admitted to the upper chamber portion 74 by a second branch conduit 77 disposed in parallel with the conduit 76 and connected thereto downstream of a flow restricting device such as a reduced diameter orifice 78. A third branch conduit 79, disposed downstream of the orifice 78 and communicating with branch conduit 77 is further provided. Branch conduit 79 is connected to an orifice plate 80 having an orifice 81 controlled by a suitable cup valve 82.

The position of the cup valve 82 is controlled by a differential pressure regulator mechanism 83 having a housing 84 defining a chamber which is divided into upper and lower chamber portions 85 and 86, respectively, by a piston member 87 connected to the cup valve 82. The upper chamber 85 is connected to the control pressure fluid conduit 55 by a conduit 88 disposed in parallel with the governor mechanism 47, while the lower chamber portion 86 is connected to the control pressure fluid conduit 53 by a conduit 89 disposed in parallel with the governor mechanism 47.

Accordingly, pressurized control fluid is transmitted by the fluid impeller mechanism 48, driven by the first turbine group 11, to the lower chamber 86, while the pressurized control fluid from the fluid impeller mechanism 49, driven by the second turbine group 17, is transmitted to the upper chamber portion 85.

With the above control system, the acceleration of the two turbine groups 11 and 17 may be closely controlled when supplied with motive steam, after the initial "warm-up" period by rotation at slow speed at low steam flow by the usual turning gear motors.

The method of control is as follows: during slow rotation of the two turbine unit groups 11 and 17, the hydraulic pressure signals from their associated impeller mechanisms 48 and 49 are substantially balanced at a very low value. Accordingly, the cup valve 82 is moved downwardly by oil pressure in the conduit 79, thereby draining the oil downstream of the orifices 78 at a rapid rate and preventing pressure from building up in the upper chamber 74 of the servovalve mechanism 66. During this period, the high pressure oil in the lower chamber 75 overcomes the bias of the spring 73 and moves the valve member 67 upwardly into blocking relation with the H.P. steam inlet port 69.

As H.P. steam is admitted to the H.P. turbine unit 12 and thence delivered to the I.P. turbine unit 18 through conduit 36, the increase in speed of the two turbine groups causes the impeller mechanisms to increase their hydraulic pressure signals. However, most of the energy in the steam is utilized to drive the H.P. turbine unit, so that the output shaft 14 of the first turbine group 11 will have a tendency to accelerate at a more rapid rate than the output shaft 22 of the second turbine group 17. This difference in roational speed of the two shafts produces a corresponding difference in the fluid pressurized by the fluid impeller mechanisms 48 and 49. Accordingly, a higher pressure signal is provided by the fluid impeller mechanism 48 than the fluid pressure signal of the fluid impeller mechanism 49 during such transistory difference in speed of the shafts. Hence, a higher pressure is also transmitted through the conduit 89 to the lower chamber 86 of the differential pressure regulator mechanism 83 than the fluid pressure signal transmitted through conduit 88 to the upper chamber portion 85 thereof. The resulting differential pressure value across the piston 87 of the regulator is effective to urge the cup valve 82 into blocking relation with its asssociated orifice 81. As the orifice 81 is blocked, the high pressure oil, which originally had been effective to maintain the lower chamber portion 75 of the servomotor at a higher value than the upper chamber 74, is opposed by an increase in oil pressure transmitted through conduit 77 to the upper chamber 74, thereby moving the movable valve member 67 in port unblocking direction and permitting the H.P. steam in conduit 65 to flow into the admission inlet 30 of the I.P. turbine unit 18.

The thus augmented steam flow to the I.P. unit is effective to increase the energization of the I.P. unit and accelerate it at a faster rate than would be obtained with the normal steam flow supplied thereto through conduit 36.

As the I.P. turbine unit 18 accelerates, the fluid impeller mechanism 49 will also increase its rotational speed and thus provides a higher degree of pressurization to the fluid flowing therethrough to its outlet conduit 55. This increased pressurization is effective to increase the pressure in the upper chamber 85 of the differential pressure regulator relative to the fluid pressure in the lower chamber portion 86 thereof. Accordingly, when the force of the pressurized fluid acting in opening direction on the cup valve 82, in addition to increased pressure in upper chamber portion 85, becomes larger than that existing in the lower chamber portion 86, the cup valve will move in opening direction. By proper design, valve member 67 of the servomotor valve mechanism 66 will move upwardly to regulate the flow of H.P. steam from conduit 65 to the I.P. unit inlet 30, and, when the percentage of rated speed of the two surbine groups is substantially equal, the valve member 17 will block the port 69, thereby terminating the augmented steam flow through conduit 65 to the I.P. unit.

With the above arrangement, the rate of acceleration of the two turbine groups may be closely maintained throughout the acceleration from low speeds to rated speed of the two shafts. However, it is desirable to provide excitation of the two generators 15 and 20 at a speed lower than rated speed of the shafts, so that the generators may be electrically connected and jointly brought up to synchronous speed. Any percentage of rated speed may be employed at which the power output of the exciters 16 and 21 is sufficient to excite the generators, for example, about fifty percent of rated speed. When the speeds of the two output shafts 14 and 22 attain about fifty percent of their rated speeds, the exciters 16 and 21 driven thereby will provide ample electrical power for exciting their associated generators. Accordingly, at this time, even though a small error difference in percent of rated speed up to about 5 percent may exist, the exciters 16 and 21 may be connected substantially concomitantly to the generators 15 and 20, respectively, by a suitable excitation control mechanism 92. As the two generators are thus electrically interlocked, the one running at a higher "error" speed will briefly accelerate the other until both are running at precisely the same percentage of rated speed.

Subsequent to such excitation of the two generators, further acceleration of the two turbine groups may be jointly attained until the generators are driven at their synchronous speeds, at which time they may be connected through their associated circuit breaker mechanisms 61 and 62 to the power transmission line L1, L2 and L3.

It is further desirable to render the servomotor valve mechanism 66 ineffective to control the augmenting H.P. steam flow to the I.P. turbine unit 18 after field excitation of the two generators is obtained. Accordingly, the differential pressure mechanism 83 may be provided with means for limiting the fluid pressure in the lower chamber portion 86 to the value corresponding to fifty percent of rated speed of the first turbine group 11. For example, a relief valve 93 may be connected to conduit 89. The relief valve is provided with a movable valve member 94 biased to the closing position by a compression spring member 95 calibrated to maintain the movable valve member 94 in the blocking position until the pressure of the fluid in the conduit 89 attains a value indicative of fifty percent speed in the first turbine group 11. As the speed of the first turbine group 11 exceeds the fifty percent value, the buid output from the fluid impeller 48 will increase sufficiently to overcome the bias of the spring member 95 and move the valve member 94 to the open position. Accordingly, the excess fluid pressure is thus bled to a suitable drain (not shown). Since, as the speed of the second turbine group 17 increases, the fluid pressurization value from the fluid impeller 49 will increase in accordance therewith, the pressure in the upper chamber portion 85 of the regulator will exceed that existing in the lower chamber portion 86 at speeds above fifty percent of rated speed, so that the cup valve 82 is moved to the unblocking position and retained therein during normal operation of the power plant. With the cup valve 82 in the open position, the pressure in the upper chamber portion 74 of the servomotor valve mechanism is reduced to substantially zero. Hence, the movable valve member 67 is maintained in the upper or port blocking position by the high fluid pressure in the lower chamber 75, thereby interrupting the H.P. steam flow from conduit 65 to the I.P. unit during normal operation.

In addition to the relief valve 93, a "cut-off" valve 96 may be provided in conduit 89, upstream of the relief valve. This valve is maintained in the open position during the starting period, but is moved to the closed position after the power plant is brought to rated speed to release the pressure in lower chamber 86.

Most central station power plants have been standardized to provide electrical power at a frequency of 60 cycles per second, and since a two-pole generator provides 60 cycle power when rotated at 3600 r.p.m., while a four-pole generator generates electrical power at 60 cycles per second when rotated at 1800 r.p.m., the rated speeds of turbine groups 11 and 17 may be the same or differ, depending upon the type of generators driven thereby. In view of the above, the pressure signals to the differential pressure regulator 84 may be modified by suitable design of the hydraulic fluid impellers 48 and 49. For example, if the generator 15 is a two-pole generator, while generator 20 is a four-pole generator, the rated speed of the power output shaft 14 is 3600 r.p.m. while the rated speed of power output shaft 22 is 1800 r.p.m. and any percentage of their rated speeds may be indicated by designing the fluid impeller mechanism 49 to pressurize its fluid at double the rate of the impeller mechanism 48.

It may be further desired to provide a visible indication of the relative speeds of the two turbine groups 11 and 17 to an operator. This visible indication may be obtained by connecting a dual pressure indicator 97 of suitable type having two fluid pressure responsive elements disposed therein (not shown) and having a pair of movable pointers 98 and 99 connected thereto. The dual indicator 97 is calibrated in r.p.m. and may be connected by a conduit 100 to conduit 89 and by a conduit 101 to conduit 88. As well known in the art, differences in pressure will be indicated as differences in speed of the turbine groups 11 and 17 by the two pointers 98 and 99, and when the pressure in conduits 88 and 89 is identical the position of the two pointers 98 and 99 will be substantially identical. This indication may be employed for indicating to the operator when the generators 15 and 20 may be connected to their exciters 16 and 21 if such excitation connection is to be manually performed. However, the invention is not limited thereto since the generators may be excited automatically by suitable means (not shown since they form no part of the invention) when the speeds of the two turbine groups attain the preselected percentage of their rated speeds.

It will now be seen that the invention provides a control system for a cross-compound turbine power plant wherein the acceleration of the two output shafts may be closely controlled, so that each may assume its share of the load when the load is divided into two separate load absorbing devices.

It will further be seen that the invention provides a highly simplified and improved arrangement for controlling the acceleration of the separate output shafts of a cross-compound turbine power plant during starting, so that separate electrical generators driven thereby may be excited by their shaft driven exciters without the need for utilizing a separate exciter during low speed turning gear rotation, heretofore required by at least one prior art arrangement.

While the invention has been shown in but one form, it will be obvious to those skilled in the art that it is not so limited, but is susceptible of various changes and modifications without departing from the spirit thereof.

What is claimed is:

1. In combination, an elastic motive fluid turbine power plant comprising a first turbine, a first load driven by said first turbine, a second turbine, a second load driven thereby, a first conduit for conveying motive fluid at a first pressure to said first turbine, means for conveying motive fluid at a second and lower pressure to said second turbine; and a control system for effecting joint acceleration during starting of said first and second turbines comprising a second conduit for conveying motive fluid at a pressure higher than said second pressure to said second turbine, a first mechanism providing a first signal indicative of the speed of said first turbine, a second mechanism providing a second signal indicative of the speed of said second turbine, means providing a third signal indicative of the difference in said first and second signals, and a valve interposed in said second conduit for controlling the flow of motive fluid therefrom to said second turbine, said valve being controlled by said third signal means, said valve being biased to a position blocking the flow of said motive fluid through said second conduit and being movable in unblocking direction when said first signal is larger than said second signal.

2. In combination, an elastic motive fluid turbine power plant comprising a first turbine, a first A.C. electrical generator, a first exciter for said first generator, said first generator and exciter being driven by said first turbine, a second turbine, a second A.C. electrical generator, a second exciter for said second generator, said second generator and exciter being driven by said second turbine, a first conduit for conveying high pressure motive fluid to said first turbine, means for conveying lower pressure motive fluid to said second turbine; a control system for effecting joint acceleration at the same rate during starting of said first and second turbines comprising a second conduit for conveying H.P. motive fluid to said second turbine, a first mechanism providing a first signal indicative of the percentage of rated speed of said first turbine, a second mechanism providing a second signal indicative of the percentage of rated speed of said second turbine, means providing a third signal indicative of the difference in said first and second signals, a valve controlled by said third signal means, said valve being interposed in said second conduit for controlling the flow of said H.P. fluid to said second turbine, said valve being biased to a position blocking the flow of said H.P. fluid and being movable in unblocking direction when said first signal is larger than said second signal, and means for connecting said first exciter to said first generator and said second exciter to said second generator when said third signal has a substantially zero value.

3. In combination, a cross-compound elastic motive fluid turbine power plant including a first turbine group and a second turbine group, said first turbine group having a H.P. turbine unit, said second turbine group having an I.P. turbine unit, a first load driven by said first turbine group, a second load driven by said second turbine group, means for supplying said H.P. turbine unit with H.P. motive fluid, means for supplying the exhaust motive fluid from said H.P. turbine unit to said I.P. turbine unit, means including a conduit for providing H.P. motive fluid to said I.P. turbine unit, and a control system for effecting joint acceleration of said first and second turbine groups during starting comprising means responsive to speed of said first turbine group for providing a first speed signal, means responsive to speed of said second turbine group for providing a second speed signal, a valve mechanism for controlling flow of H.P. motive fluid from said conduit to said I.P. turbine unit, and means responsive to the difference between said first and second speed signals for controlling said valve mechanism, said valve mechanism having a valve member movable in one direction to restrict flow of motive fluid through said conduit and in the opposite direction to permit flow therethrough to said I.P. turbine unit, and said speed signal difference responsive means being arranged to move said valve member in said opposite direction when said first signal is greater than said second signal and to move said valve member in said one direction when said signals are equal.

4. In combination, a cross-compound elastic motive fluid turbine power plant comprising a first turbine group and a second turbine group, said first turbine group including a H.P. turbine and a L.P. turbine connected in tandem, said second turbine group including an I.P. turbine, a first load driven by said first turbine group, a second load driven by said second turbine group, means for supplying H.P. motive fluid to said H.P. turbine, means for supplying the exhaust motive fluid from said H.P. turbine to said I.P. turbine, means for providing H.P. motive fluid to said I.P. turbine, and a control system for effecting joint acceleration during starting of said first and second turbine groups comprising a source of hydraulic fluid, a first hydraulic fluid pressurizing impeller driven by said first turbine group, a second hydraulic fluid pressurizing impeller driven by said second group, means for supplying said hydraulic fluid to said first and second impellers, said first and second impellers pressurizing said hydraulic fluid as a function of the rotary speed of their associated turbine groups to provide first and second speed signals, respectively, a servovalve mechanism for controlling flow of said H.P. motive fluid to said I.P. turbine, and means for controlling said servovalve mechanism in response to the difference in pressure of said first and second signals, said servovalve mechanism having a valve member movable in one direction to restrict flow of H.P. motive fluid to said I.P. turbine unit and movable in the opposite direction to permit flow of H.P. motive fluid to said I.P. turbine unit, and said pressure difference responsive means being effective to move said valve member in said opposite direction when the pressure value of said first signal is greater than the pressure value of said second signal, and in said one direction when the pressure values of said signals are equal.

5. In combination, a cross-compound elastic motive fluid turbine power plant including a first turbine group and a second turbine group, said first turbine group having a H.P. turbine unit, said second turbine group having an I.P. turbine unit, a first A.C. generator, a first exciter for said generator, said first generator and exciter being driven by said first turbine group, a second A.C. generator, a second exciter for said second generator, said second generator and exciter being driven by said second turbine group, means for supplying said H.P. turbine unit with H.P. motive fluid, means for supplying the exhaust motive fluid from said H.P. turbine unit to said I.P. turbine unit, means including a conduit for providing augmenting H.P. motive fluid to said I.P. turbine unit, a system for controlling the joint rate of acceleration of said first and second turbine groups during starting comprising means responsive to speed of said first turbine group for providing a second speed signal, a valve mechanism for controlling flow of H.P. motive fluid from said conduit to said I.P. turbine unit, and means responsive to the difference between said first and second speed signals for controlling said valve mechanism, said valve mechanism having a valve member movable in one direction to restrict flow of motive fluid through said conduit and in the opposite direction to permit flow therethrough to said I.P. turbine unit, said speed signal difference responsive means being arranged to move said valve member in said opposite direction when said first signal is greater than said second signal and to move said valve member in said one direction when said signals are equal, and means for connecting said first exciter to said first generator and said second exciter to said second generator when said signals are equal.

6. In combination, a cross-compound elastic motive fluid turbine power plant comprising a high pressure (H.P.) turbine, an intermediate pressure (I.P.) turbine, a low pressure (L.P.) turbine, said H.P. turbine and said L.P. turbine being connected in tandem, a first A.C. generator and a first exciter driven by said H.P. and L.P. turbines, a second A.C. generator and a second exciter driven by said I.P. turbine, means for supplying H.P. motive fluid to said H.P. turbine, means for supplying the exhaust motive fluid from said H.P. turbine to said I.P. turbine; and a control system for effecting joint acceleration during starting of said H.P. turbine and said I.P. turbine comprising means for providing H.P. motive fluid to said I.P. turbine, a source of hydraulic fluid, a first hydraulic fluid pressurizing impeller driven by said H.P. turbine, a second hydraulic fluid pressurizing impeller driven by said I.P. turbine, means for supplying said hydraulic fluid to said first and second impellers, said impellers pressurizing said hydraulic fluid as a function of the rotary speed of their associated turbines, a servovalve for controlling flow of said H.P. motive fluid to said I.P. turbine, means for controlling said servovalve in response to the difference in pressure of the pressurized hydraulic fluid from said impellers, means for limiting the pressurized fluid from the first impeller to a value equal to the pressure obtained at about fifty percent of the rated speed of said H.P. turbine, and means for connecting said first exciter to said first generator and said second exciter to said second generator when the value of the pressurized fluid from said impellers is equal and indicative of about fifty percent of the rated speed of said H.P. and I.P. turbines.

7. In combination, a cross-compound elastic motive fluid turbine power plant comprising a first turbine group and a second turbine group, said first turbine group including a H.P. turbine and a L.P. turbine connected in tandem, said second turbine group including an I.P. turbine and a L.P. turbine connected in tandem, a first A.C. generator, a first exciter for said generator, said first generator and exciter being driven by said first turbine group, a second A.C. generator, a second exciter for said second generator, said second generator and exciter being driven by said second turbine group, means for supplying H.P. motive fluid to said H.P. turbine, means for supplying the exhaust motive fluid from said H.P. turbine to said I.P. turbine, means for providing H.P. motive fluid to said I.P. turbine, a hydraulic speed governor for jointly regulating the speed of said first and second turbine groups to a rated value, and a control system for effecting joint acceleration at the same rate during starting of said first and second turbine groups comprising a source of hydraulic fluid, a first hydraulic fluid pressurizing impeller driven by said first turbine group, a second hydraulic fluid pressurizing impeller driven by said second turbine group, means for supplying said hydraulic fluid to said first and second impellers, said first and second impellers pressurizing said hydraulic fluid as a function of the rotary speed of their associated turbine groups to provide first and second speed signals, respectively, means for transmitting said first and second speed signals to said speed governor, a servovalve mechanism for controlling flow of said H.P. motive fluid to said I.P. turbine, means for controlling said servovalve mechanism in response to the difference in pressure of said first and second signals, said servovalve mechanism having a valve member movable in one direction to restrict flow of H.P. motor fluid to said I.P. turbine and movable in the opposite direction to permit flow of H.P. motive fluid to said I.P. turbine, said pressure difference responsive means being effective to move said valve member in said opposite direction when the pressure value of said first signal is greater than the pressure value of said second signal, and in said one direction when the pressure values of said signals are at least equal, valve means for limiting the pressure value of said first signal to substantially fifty percent of that obtained at rated speed of said first turbine group, and means for connecting said first exciter to said first generator and said second exciter to said second generator when said first and second speed signals are equal and indicative of fifty percent rated speed of their associated turbine groups.

References Cited in the file of this patent

UNITED STATES PATENTS 2,671,859     Walbene _____ Mar. 9, 1954